United States Patent [19]

Iijima

[11] Patent Number: 5,573,326

[45] Date of Patent: Nov. 12, 1996

[54] OPTICAL AXIS ADJUSTING DEVICE OF VEHICLE LAMP

[75] Inventor: Takayuki Iijima, Isehara, Japan

[73] Assignee: Ichikoh Industries Ltd., Tokyo, Japan

[21] Appl. No.: 444,367

[22] Filed: May 18, 1995

[30] Foreign Application Priority Data

Nov. 8, 1994 [JP] Japan .................. 6-273448

[51] Int. Cl.$^6$ ...................................... B60Q 1/06
[52] U.S. Cl. .................. 362/66; 362/273; 362/284; 362/289; 362/424; 362/428
[58] Field of Search .................. 362/66, 61, 80, 362/273, 284, 289, 421, 422, 424, 428; 74/89.13

[56] References Cited

U.S. PATENT DOCUMENTS

| | | | |
|---|---|---|---|
| 1,806,203 | 5/1931 | Huston | 74/89.13 |
| 4,843,523 | 6/1989 | Nakamura | 362/422 |
| 5,260,857 | 11/1993 | Lukkarinen et al. | 362/66 |
| 5,321,590 | 6/1994 | Wu | 362/421 |
| 5,365,415 | 11/1994 | Schmitt et al. | 362/66 |
| 5,381,317 | 1/1995 | Schmitt et al. | 362/284 |

Primary Examiner—Denise L. Gromada
Assistant Examiner—Alfred Basichas
Attorney, Agent, or Firm—Foley & Lardner

[57] ABSTRACT

An optical axis adjusting device of a vehicle lamp is provided which comprises a reflector tiltably fixed to a lamp housing by a joint member; an aiming screw, turnably laid between the lamp housing and the reflector, for tilting the reflector; a drive gear fastened to an end of the aiming screw; a racing gear facing the drive gear and mounted on the aiming screw so as to rotate relatively with the aiming screw; toothed parts formed in respective surfaces of the drive and racing gears facing each other; and a guide, formed on the housing, for guiding a tool to be engaged with the toothed parts. When the tool is turned, the aiming screw is turned simultaneously with the rotation of the drive gear. The racing gear rotates in a direction opposite to that of the drive gear.

13 Claims, 6 Drawing Sheets

OPTICAL AXIS ADJUSTING DEVICE OF VEHICLE LAMP

BACKGROUND OF THE INVENTION

1. Field of the Invention

This invention relates to an optical axis adjusting device of a vehicle lamp in which an optical axis of illumination light can be adjusted from the outside of a lamp housing of the vehicle lamp.

2. Description of the Prior Art

An optical axis adjusting device is known as shown in FIG. 7. In FIG. 7, reference numerals 1 and 2 designate a lamp housing of a vehicle lamp and a lens closing an opening of the lamp housing, respectively. The lamp housing 1 is made of synthetic resin. A lighting chamber 3 is defined by the lamp housing 1 and the lens 2. A reflector 4 holding a bulb (not shown) is disposed in the lighting chamber 3. An optical axis adjusting mechanism 5 causes the reflector 4 to tilt, thereby changing the direction of an optical axis of the bulb. The optical axis adjusting mechanism 5 is constructed as follows.

A supporting portion $1c$ and a supporting projection $1b$ which juts out toward the lighting chamber 3 are formed on the inner surface of a rear wall $1a$ of the housing 1. A cylindrical guide $1d$ is formed along the outer surface of the rear wall $1a$ of the housing 1. The supporting portion $1c$ is disposed at the lower part of the housing 1 than the supporting projection $1b$. In the housing, another supporting portion, which is a pair to the supporting portion $1c$, is formed at an interval in the lateral direction of a vehicle body. The supporting portions may be disposed at the upper part of the housing 1. A positional relationship between the supporting projection $1b$ and the supporting portions $1c$ is known in the art. A spherical hollow $1e$ is formed in the supporting projection $1b$. The spherical hollow $1e$ is opened via a conical opening $1f$. A pillar $4a$ facing the conical opening $1f$ is formed on the rear surface of the reflector 4 integrally with the reflector 4. Likewise, a holding tube $4b$ facing the supporting portion $1c$ is formed on the rear surface of the reflector 4 integrally therewith. A joint member 6 is laid between the pillar $4a$ and the supporting projection $1b$. The joint member 6 comprises a spherical part $6a$ and a screw thread part $6b$. The spherical part $6a$ is movably fitted into the spherical hollow $1e$, and the thread part $6b$ is engaged with a corresponding thread part of the pillar $4a$. An ball-like screw nut 7 is mounted in the tube $4b$. An aiming screw 8 is rotatably laid between the tube $4b$ and the supporting portion $1c$. The tip part $8a$ of the aiming screw 8 has threads, and the head part $8b$ thereof juts out of the rear wall $1a$ of the housing 1. The thread part $8a$ is engaged with the ball-like screw nut 7, and the head part $8b$ is provided with a metallic drive gear 9 fixedly.

A tool D, such as a screwdriver, is guided by the guide $1d$ so that the tip of the tool D is engaged with a tooth $9a$ of the drive gear 9. The rotation of the tool D in the above state leads to the rotation of the drive gear 9, thereby leading to the rotation of the aiming screw 8. Accordingly, the ball-like screw nut 7 is moved in the direction of the axis of the aiming screw 8 relatively with respect to the thread part $8a$ of the aiming screw 8. Accordingly, the reflector 4 is tilted on the spherical part $6a$ of the joint member 6 so as to adjust the optical axis of the bulb.

In the conventional optical axis adjusting device, the tool D receives reaction force caused by the rotation of the drive gear 9 in a direction in which the tool D and the tooth $9a$ are separated from each other. Therefore, the tip of the tool D becomes unsteady, and the aiming screw 8 cannot be easily rotated in a state in which the tip of the tool D is tightly engaged with the tooth $9a$. In addition, due to the reaction force, the tool D is inclined with respect to an axis (direction in which the tool D is guided) of the guide $1d$ and, therefore, part of the tool D is strongly pushed against the inner wall of the guide $1d$. Disadvantageously, the rotation of the tool D under this state brings about abrasion or crack of the inner wall of the guide $1d$.

Further, in the conventional optical axis adjusting device, when the tool D is inserted into the guide $1d$, the tip of the tool D cannot be wholly viewed and cannot be quickly placed in proper position. Therefore, the tool D is excessively or insufficiently pushed into the guide $1d$. If insufficiently, the tip of the tool D is loosely engaged with the tooth $9a$. The rotation of the tool D under the state of loose engagement often brings about deformation of the tooth $9a$. On the other hand, if excessively, not only the tooth $9a$ but also the drive gear 9 itself might be broken.

Further, if the drive gear 9 is made of synthetic resin for the purpose of reduction in weight and cost, the tip of the tool D might break the tooth $9a$ because of the incomplete engagement of the tip with the tooth $9a$ when rotated.

It is therefore a first object of the present invention to provide an optical axis adjusting device of a vehicle lamp in which the tip of a tool and a toothed part of a drive gear are certainly engaged with each other when an optical axis of the lamp is adjusted.

It is a second object of the present invention to provide an optical axis adjusting device of a vehicle lamp in which synthetic resin can be used for an optical axis adjusting mechanism.

It is a third object of the present invention to provide an optical axis adjusting device of a vehicle lamp in which the tip of the tool is easily positioned when inserted.

Other objects of the present invention will be appreciated from the embodiments described hereinafter.

SUMMARY OF THE INVENTION

To achieve the first object, the optical axis adjusting device of the vehicle lamp according to the present invention comprises a reflector tiltably fixed to a lamp housing by means of a joint member; an aiming screw, turnably laid between the lamp housing and the reflector, for tilting the reflector; a drive gear fastened to an end of the aiming screw; a racing gear facing the drive gear and mounted on the aiming screw so as to rotate relatively with the aiming screw; toothed parts formed in respective surfaces of the drive and racing gears facing each other; and a guide, formed on the housing, for guiding a tool to be engaged with the toothed parts. Preferably, a direction in which the tool is guided is perpendicular to a direction of an axial line of the aiming screw. Further, preferably, the drive gear is provided with a knob extending in the axial direction of the aiming screw, and the aiming screw is operated by the knob from the axial direction of the aiming screw.

In order to lighten the device and reduce production costs, preferably, the drive gear and the racing gear are made of synthetic resin. More preferably, the drive gear and the aiming screw are integrally made of synthetic resin. Further, preferably, the drive gear or the racing gear is provided with a positioning base by which the tip of the tool inserted into the guide is properly positioned.

The guide formed on the back of the lamp housing is a cylinder circular in section or a groove semicircular in section, but the groove type of guide is much preferable because it is possible to observe a state in which the tip of the tool is engaged with the toothed part of the drive gear. In the case of the groove type of guide, fine adjustment to the optical axis of the bulb can be advantageously made because an operator can bring a thumb of operator's hand, which is free without gripping the tool, into contact with a shank of the tool and operate the tool by the other hand.

DETAILED DESCRIPTION OF THE PREFERRED EMBODIMENT

FIGS. 1 through 3B show a first embodiment of an optical axis adjusting device of a vehicle lamp according to the present invention.

Figure 1:
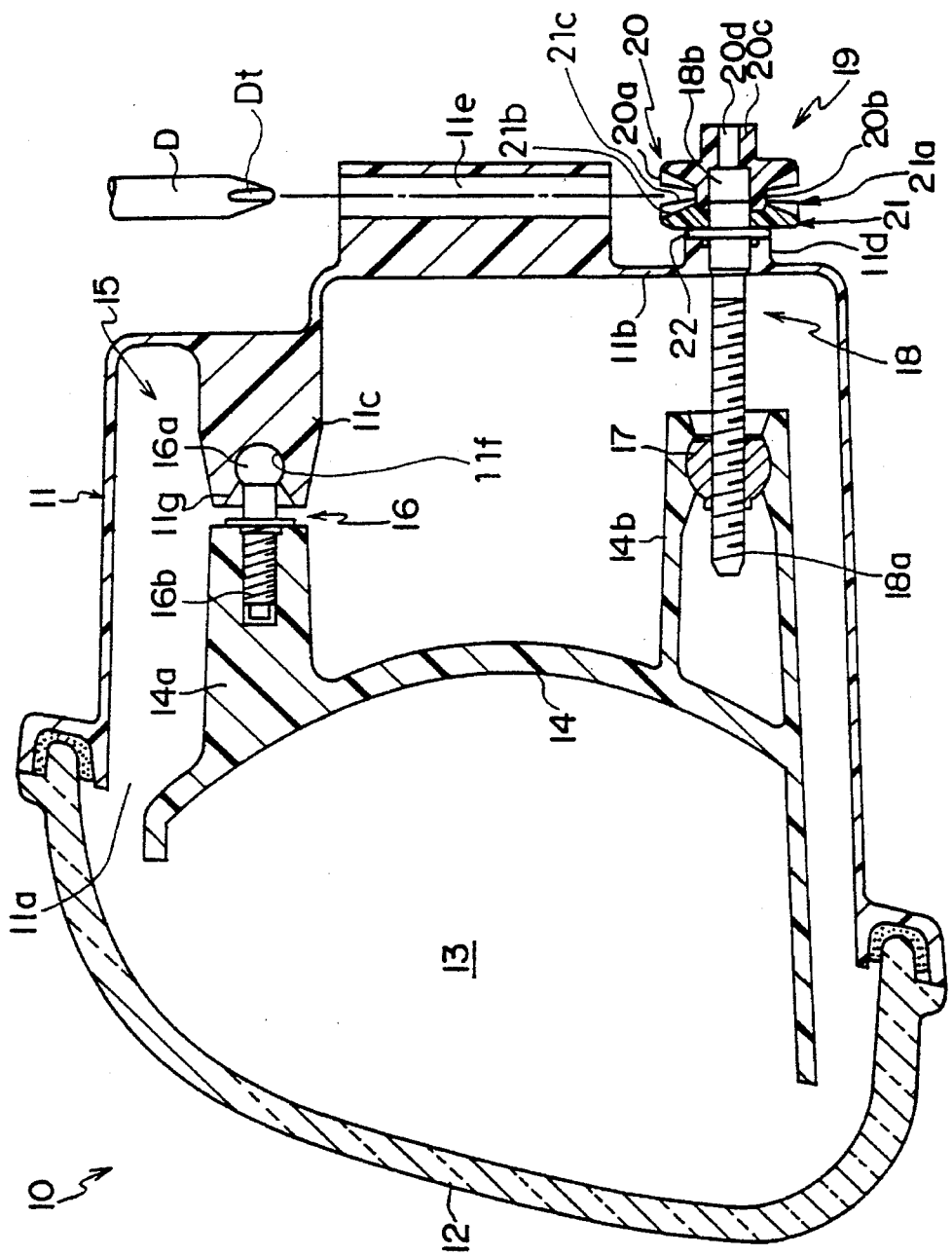
FIG. 1 is a longitudinal sectional view showing a first embodiment of an optical axis adjusting device according to the present invention.

In FIG. 1, reference numeral 11 designates a synthetic-resin-made lamp housing of the vehicle lamp, and reference numeral 12 designates a lens closing an opening 11a of the lamp housing 11. A lighting chamber 13 is defined by the lamp housing 11 and the lens 12. A reflector 14 holding a bulb (not shown) is mounted in the lighting chamber 13. The reflector 14 is tilted by operating an optical axis adjusting mechanism 15, so that the direction of an optical axis of the bulb is changed. The optical axis adjusting mechanism 15 is constructed as follows.

A projection 11c and a supporting portion 11d are formed on a rear wall 11b of the lamp housing 11. The projection 11c juts out into the lighting chamber 13. A cylindrical guide 11e is formed on the outer surface of the rear wall 11b of the housing 11. The supporting portion 11d is disposed at the lower part of the housing 11 than the projection 11c. In the lamp housing 11, another supporting portion is disposed apart from the supporting portion 11d in the lateral direction of a vehicle body. The pair of supporting portions may be disposed at the upper part of the housing 11. In the first embodiment, the supporting portion 11d juts out toward the outside of the housing 11.

Figure 2:
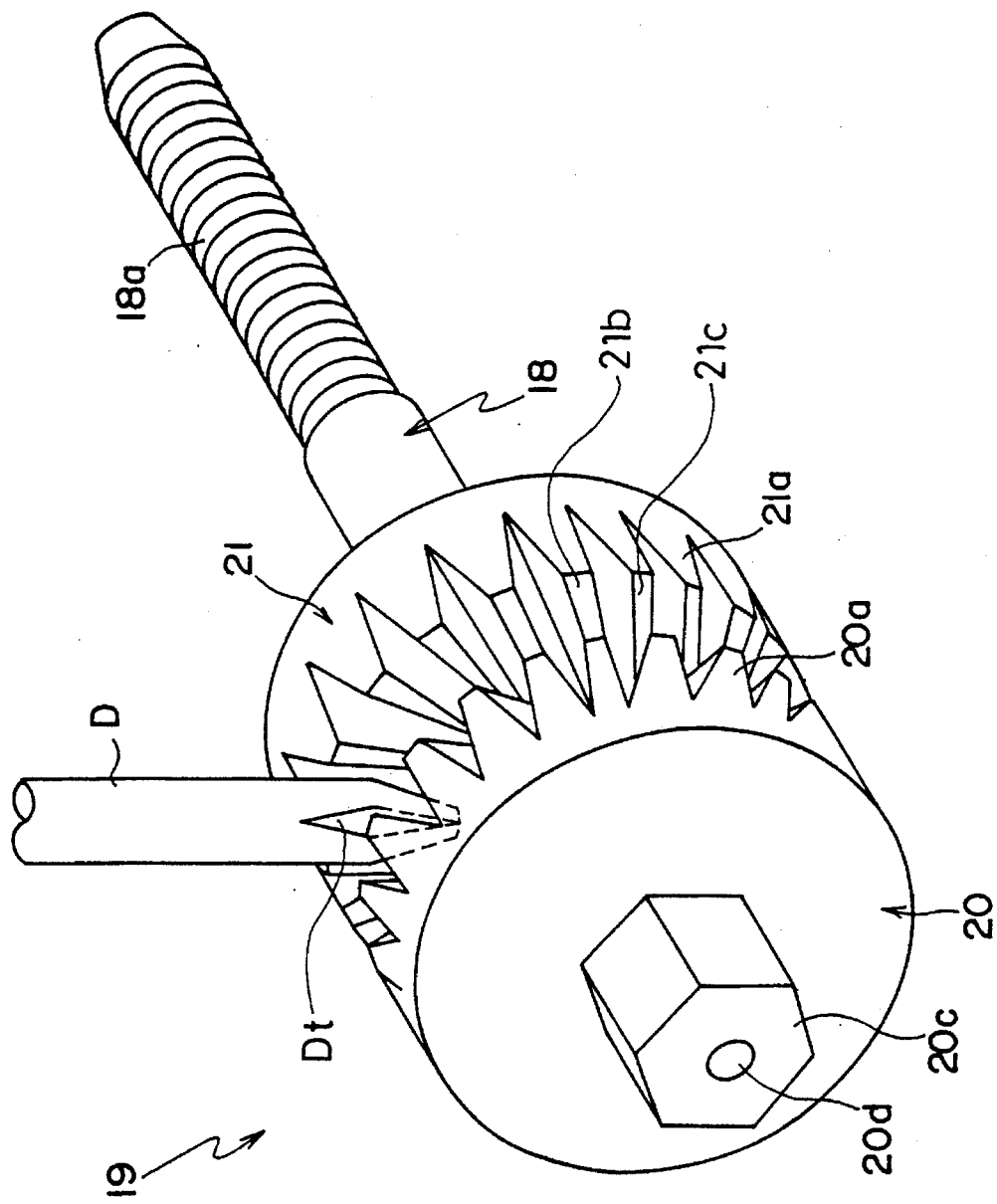
FIG. 2 is a perspective view of an aiming screw of FIG. 1.
Figure 3:
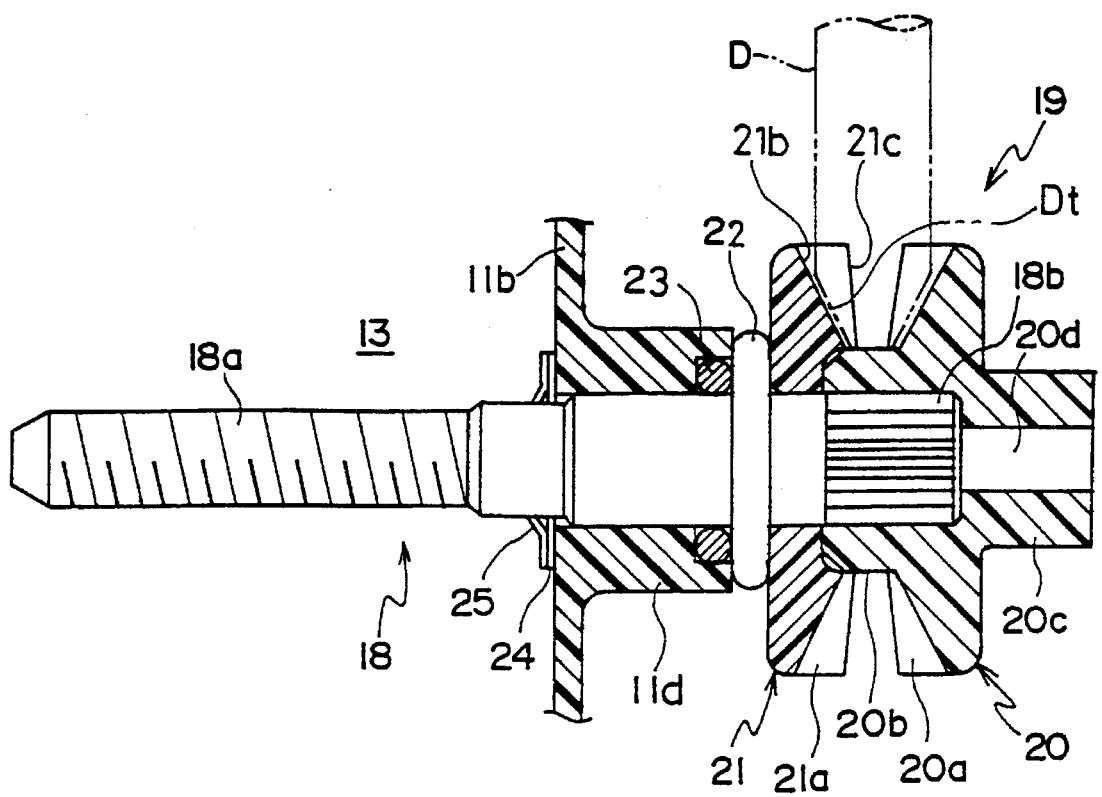
FIG. 3A is an enlarged sectional view of a main part of the optical axis adjusting device.
FIG. 3B is an enlarged rear view of a drive gear of FIG. 1.
Figure 3:
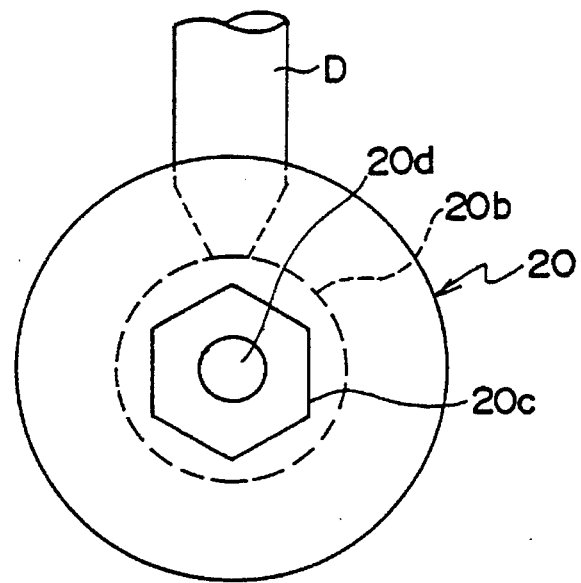

The projection 11c has a spherical hollow 11f which is opened through a conical opening 11g. On the rear surface of the reflector 14, a pillar 14a facing the conical opening 11g is integrated with the reflector 14, and further a holding tube 14b facing the supporting portion 11d is integrated therewith. A joint member 16 is laid between the pillar 14a and the projection 11c. The joint member 16 consists of a spherical head 16a and a thread part 16b. The spherical head 16a is rotatably fitted in the spherical hollow 11f, and the thread part 16b is engaged with a corresponding thread part of the pillar 14a. A ball-like screw nut 17 is rotatably mounted in the holding tube 14b. An aiming screw 18 is turnably laid between the holding tube 14b and the supporting portion lid. A point part 18a of the aiming screw 18 has threads, while a head part 18b thereof juts out of the rear wall 11b of the housing 11 toward the outside. The thread part (point part) 18a of the aiming screw 18 is engaged with the ball-like screw nut 17, and the head part 18b serves as an operating portion 19 to an end of which a drive gear 20 is fixed. A racing gear (gear rotating without a working load) 21 made of synthetic resin faces the drive gear 20 in the operating portion 19. The racing gear 21 is turnable relatively with respect to the aiming screw 18. As shown in FIG. 2, the gears 20, 21 have V-shaped teeth 20a, 21a facing each other, respectively. In the operating portion 19, a flange 22 for positioning is integrated with the aiming screw 18. The racing gear 21 and the drive gear 20 are inserted into the operating portion 19 from the head part side of the aiming screw 18 so as to unite therewith. As shown in FIGS. 3(A) and 3(B), the drive gear 20 has a base 20b extending in the axial direction of the aiming screw 18. The base 20b juts out toward the racing gear 21. A reinforcing projection 20c and a hole 20d are formed at the rear end of the drive gear 20. The projection 20c reinforces the drive gear 20 when installed, and the hole 20d made in the projection 20c is used to inject resin thereinto or draw air therefrom. In FIG. 3(A), reference numeral 23 designates a sealing member, 24 designates a web washer, and 25 designates a push nut. In this embodiment, the drive gear 20 and the racing gear 21 are each made of synthetic resin. Instead, both or either of them may be made of metal.

A tool D, such as a screwdriver, is guided into the guide 11e. Then, the tip of the tool D is inserted between the tooth 20a of the drive gear 20 and the tooth 21a of the racing gear 21 so as to be engaged with them. The positioning of the tool D in a direction in which it is inserted is carried out by contacting the tip of the tool D with the base 20b. Thereby, the tip of the tool D is certainly engaged with the teeth 20a, 21a. In this state, the tool D is turned to rotate the gear 20. The rotation of the drive gear 20 simultaneously brings about the turning of the aiming screw 18. On the other hand, the racing gear 21 is rotated in a direction opposite to the rotation of the drive gear 20. The rotation of the drive gear 20 gives the tip of the tool D reaction force by which the engagement of the tip with the tooth 20a is released, whereas the rotation of the racing gear 21 gives the tip thereof force by which the reaction force is offset. In other words, when turning the tool D, concave and convex walls 21b and 21c of the tooth 21a of the racing gear 21 alternately come into contact with the tip Dt of the tool D, so that the racing gear 21 pushes the tip Dt against the drive gear 20. Therefore, the tip Dt of the tool D becomes stable and accordingly an operator can operate the tool D as if it is attracted by the tooth 20a of the drive gear 20. Accordingly, when turning the tool D, the tip of the tool D is closely engaged with the drive gear 20.

The aiming screw 18 is rotated simultaneously with the rotation of the drive gear 20, so that the ball-like screw nut 17 is moved in the axial direction of the aiming screw 18 relatively with the thread part 18a of the aiming screw 18. Accordingly, since the reflector 14 is tilted on the spherical head 16a of the joint member 16, adjustment to the optical axis of the bulb can be made.

Figure 4:
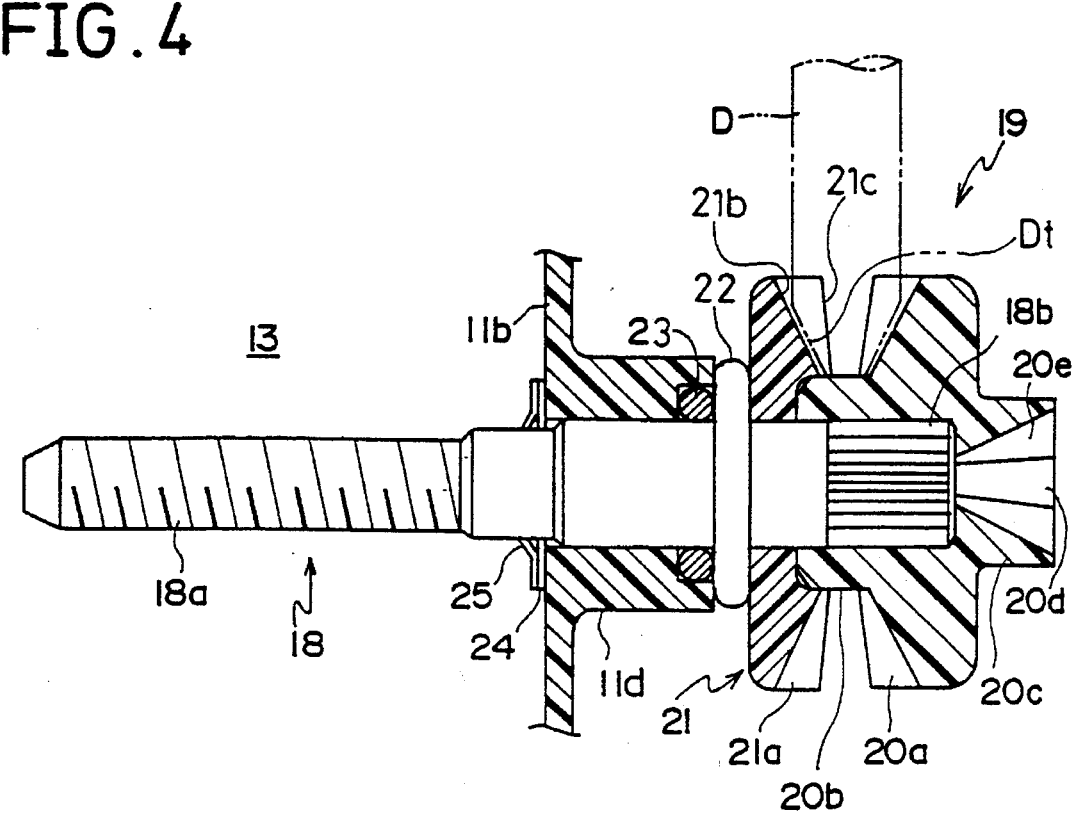
FIG. 4 is an enlarged sectional view of a main part of an optical axis adjusting device showing a variant of the first embodiment of the present invention.

The reinforcing projection 20c is also used as an operating knob. For instance, in a manufacturing process of the vehicle lamp 10, the adjustment to the optical axis can be made with the projection 20c. Further, even in a case where the housing 11 is united to the vehicle body, the adjustment thereto can be made with the same if space exists behind the housing 11. As shown in FIG. 4, a toothed portion 20e may be formed in the air-bleeder hole 20d so as to operate the aiming screw 18 with the tool D from the axial direction of the aiming screw 18.

Figure 5:
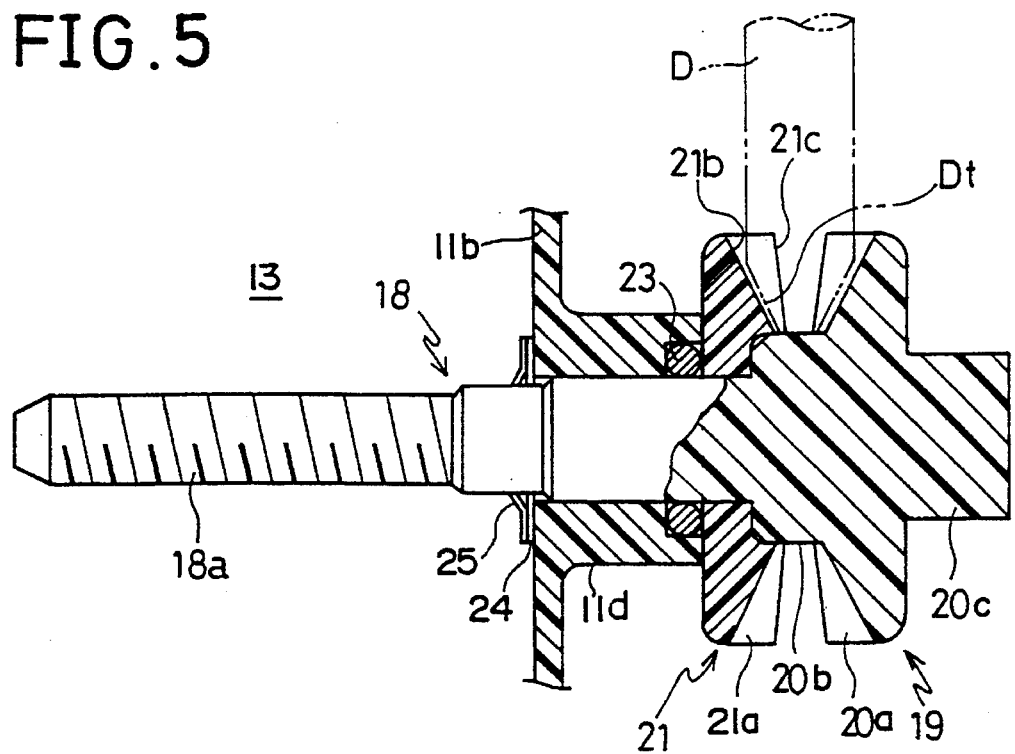
FIG. 5 is an enlarged sectional view of a main part of an optical axis adjusting device showing a second embodiment of the present invention.

FIG. 5 shows a second embodiment of the optical axis adjusting device of the vehicle lamp according to the present invention.

In the second embodiment, the aiming screw 18 and the drive gear 20 are integrally made of synthetic resin, and the flange 22 is not formed in the operating portion 19. Instead, the racing gear 21 are fixed to the operating portion 19 from the side of the thread part 18a. The construction of the remaining constituents is almost the same as that in the first embodiment. Therefore, the same numerals are each given to the same constituents as those in the first embodiment, and a detailed description thereof is omitted. According to the second embodiment, the reduction of the number of constituent parts, of the weight of the device, and of the number of construction processes can be realized.

Figure 6:
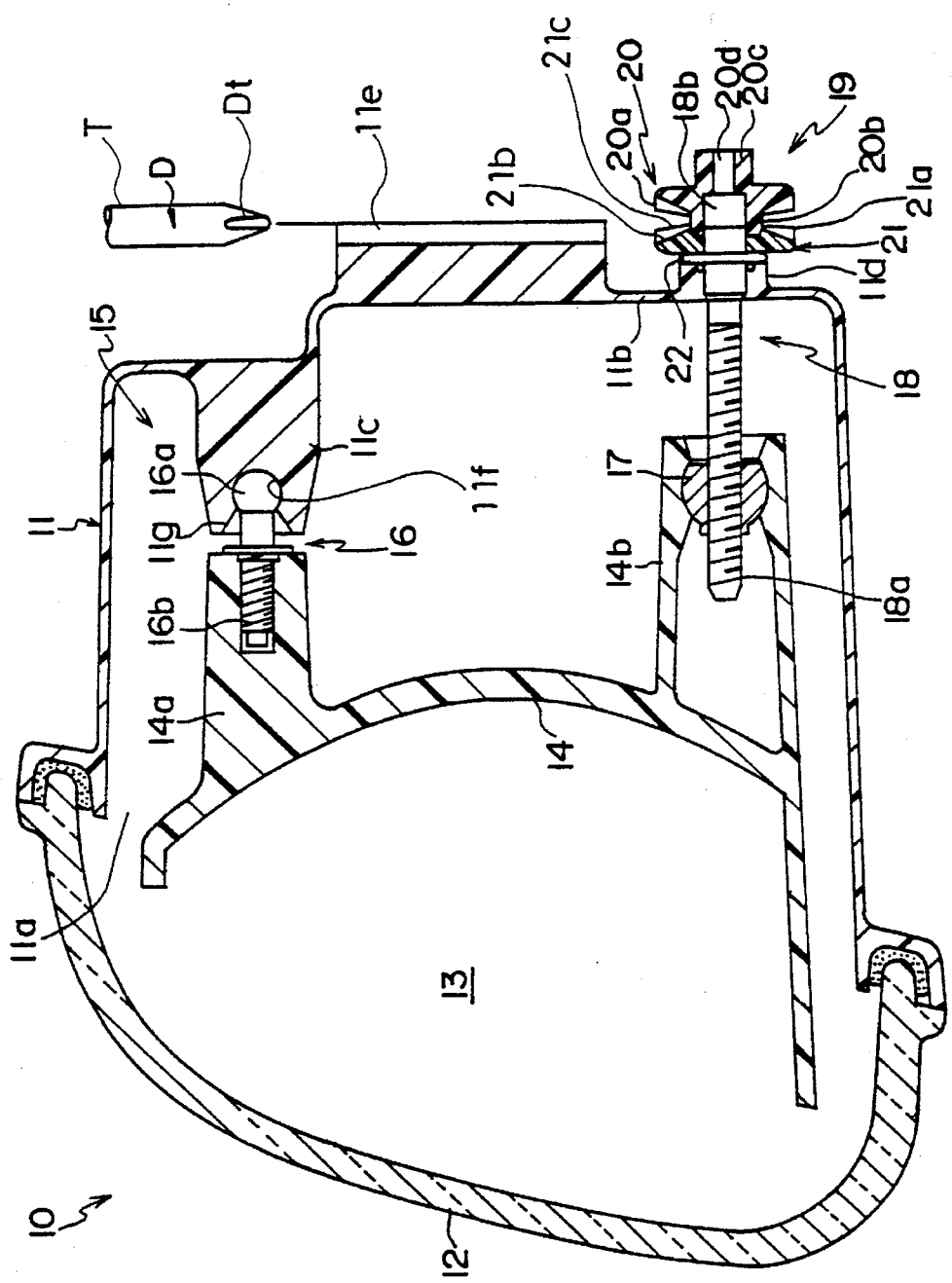
FIG. 6 is a longitudinal sectional view showing a third embodiment of an optical axis adjusting device according to the present invention.
Figure 7:
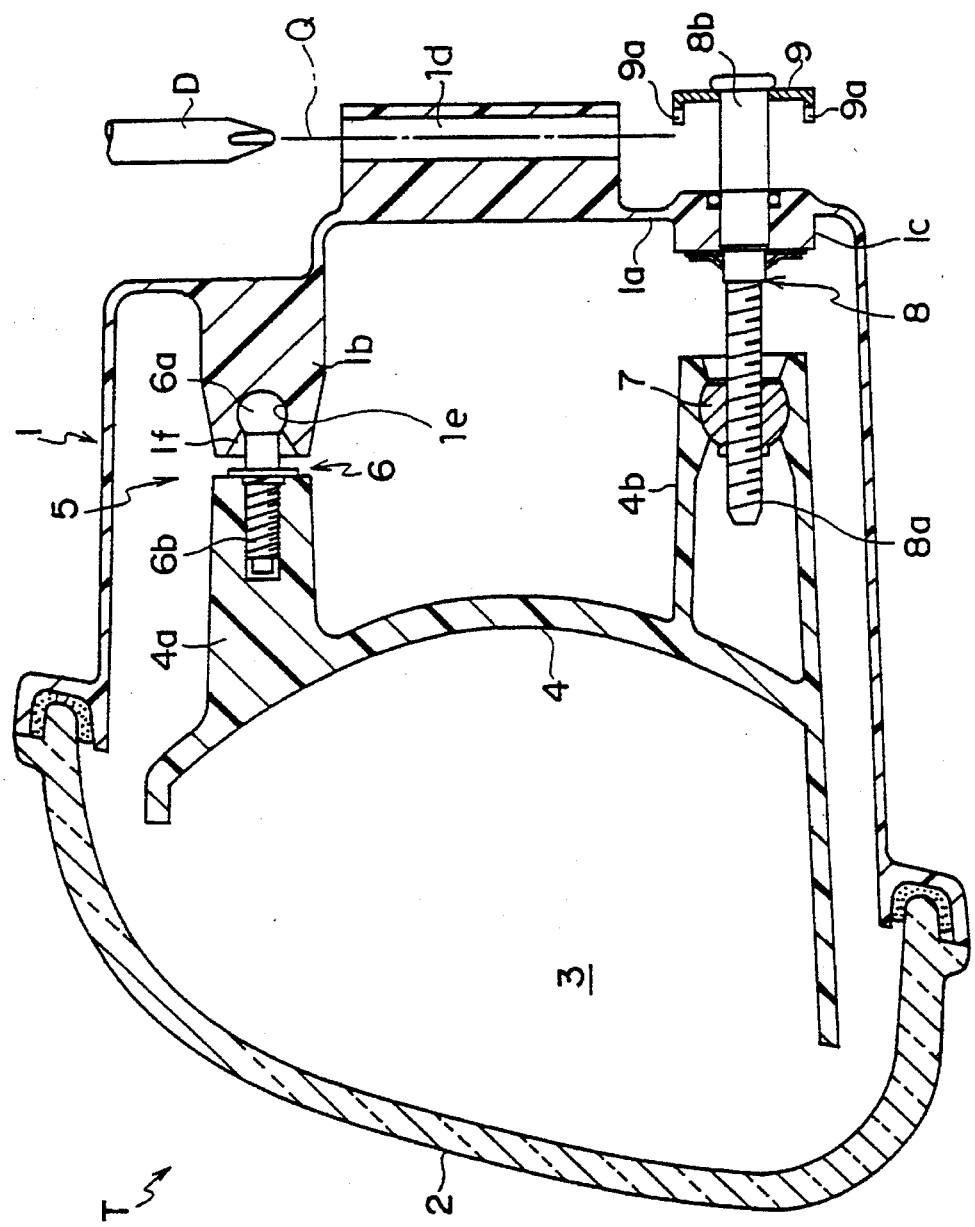
FIG. 7 is a longitudinal sectional view of a conventional optical axis adjusting device.

FIG. 6 shows a third embodiment of the optical axis adjusting device of the vehicle lamp according to the present invention.

In the third embodiment, the guide 11e is a guide groove shaped into a semicircle in section.

According to the third embodiment, the tip of the tool D can be certainly engaged with the toothed part 20a of the drive gear 20 such that, when operating the tool D, a handgrip side of the tool D is slightly inclined to the vehicle lamp and then the tip of the tool D is pushed to the drive gear 20 by using the semicircular guide groove 11e as a support. Accordingly, the housing 11 can be more easily molded than that with a cylindrical guide.

Further, when occasion demands, a thumb of operator's hand other than the hand gripping the tool D is touched to a shank T of the tool D and then the tool D is brought into slight contact with the guide groove 11e, so that the tool D can be operated in a state in which the tool D is more certainly made perpendicular to the axis of the aiming screw 18. Accordingly, fine adjustment to the optical axis of the bulb can be advantageously made.

In the above embodiments, in order to make adjustment to the optical axis of the bulb, the reflector 14 is movably disposed in the housing 11 and is tilted by means of the aiming screw 18. However, the present invention is not limited to this. For example, the following construction may be adopted. The housing 11 with the reflector 14 is movably fixed to the vehicle body (not shown). The aiming screw 18 for moving the housing 11 is turnably laid between the vehicle body and the housing 11. The drive gear 20 is fastened to the end of the aiming screw 18. The racing gear 21 facing the drive gear 20 is placed so as to turn relatively with the aiming screw 18. Toothed parts are formed on the surfaces of the gears 20 and 21, and the guide 11e for guiding the tool D to be engaged with the toothed parts is formed in the vehicle body.

What is claimed is:

1. An optical axis adjusting device of a vehicle lamp, comprising:
    a reflector tiltably fixed to a lamp housing by means of a joint member;
    an aiming screw, turnably laid between said lamp housing and said reflector, for tilting said reflector;
    a drive gear fastened to an end of said aiming screw;
    a racing gear facing said drive gear, said racing gear being mounted on said aiming screw so as to rotate relatively with said aiming screw;
    toothed parts formed in respective surfaces of said drive and racing gears facing each other; and
    a guide, said guide being formed on a rear surface of said lamp housing, for guiding a tool to be engaged with said toothed parts, wherein said tool is inserted into a space between said drive gear and said racing gear, along said groove from a direction perpendicular to a direction of an axial line of said aiming screw.

2. An optical axis adjusting device of a vehicle lamp according to claim 1, wherein said drive gear is provided with a knob extending in the axial direction of said aiming screw, said aiming screw being operated by said knob from the axial direction of said aiming screw.

3. An optical axis adjusting device of a vehicle lamp according to claim 1, wherein at least one of said drive gear and said racing gear is made of synthetic resin.

4. An optical axis adjusting device of a vehicle lamp according to claim 1, wherein said drive gear and said aiming screw are integrally made of synthetic resin.

5. An optical axis adjusting device of a vehicle lamp according to claim 3, wherein said drive gear or said racing gear is provided with a positioning base with which a tip of said tool is brought into contact.

6. An optical axis adjusting device of a vehicle lamp according to claim 1, wherein said guide is a cylinder formed on a rear surface of said lamp housing.

7. An optical axis adjusting device of a vehicle lamp according to claim 2, wherein at least one of said drive gear and said racing gear is made of synthetic resin.

8. An optical axis adjusting device of a vehicle lamp according to claim 2, wherein said drive gear and said aiming screw are integrally made of synthetic resin.

9. An optical axis adjusting device of a vehicle lamp according to claim 4, wherein said drive gear or said racing gear is provided with a positioning base with which a tip of said tool is brought into contact.

10. An optical axis adjusting device of a vehicle lamp, comprising:
    a lamp housing including a reflector, said lamp housing being movably fixed to a vehicle body;
    an aiming screw, turnably laid between said lamp housing and said vehicle body, for moving said lamp housing;
    a drive gear fastened to an end of said aiming screw;
    a racing gearing facing said drive gear, said racing gearing being mounted on said aiming screw so as to rotate relatively with said aiming screw;
    toothed parts formed in respective surfaces of said drive and racing gears facing each other; and
    a guide, said guide being formed on said vehicle body, for guiding a tool to be engaged with said toothed parts, wherein said tool is inserted into a space between said drive gear and said racing gear, along said guide from a direction perpendicular to a direction of an axial line of said aiming screw.

11. An optical axis adjusting device of a vehicle lamp according to claim 10, wherein at least one of said drive gear and said racing gear is made of synthetic resin.

12. An optical axis adjusting device of a vehicle lamp according to claim 11, wherein said drive gear and said aiming screw are integrally made of synthetic resin.

13. An optical axis adjusting device of a vehicle lamp according to claim 12, wherein said drive gear or said racing gear is provided with a positioning base with which a tip of said tool is brought into contact.

* * * * *